A. W. KEGLER.
TANK CONSTRUCTION.
APPLICATION FILED APR. 28, 1915.

1,203,007.

Patented Oct. 31, 1916.

Inventor,
A. W. Kegler, by
G. C. Kennedy.
Attorney.

UNITED STATES PATENT OFFICE.

ANTON W. KEGLER, OF WATERLOO, IOWA.

TANK CONSTRUCTION.

1,203,007.  Specification of Letters Patent.  Patented Oct. 31, 1916.

Application filed April 28, 1915. Serial No. 24,514.

*To all whom it may concern:*

Be it known that I, ANTON W. KEGLER, a citizen of the United States of America, and a resident of Waterloo, Blackhawk county, Iowa, have invented certain new and useful Improvements in Tank Construction, of which the following is a specification.

Figure 2:
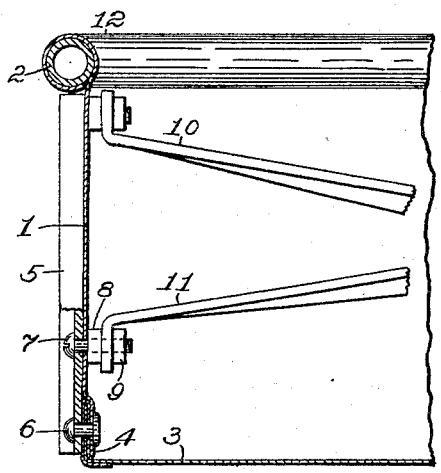
Figure 3:
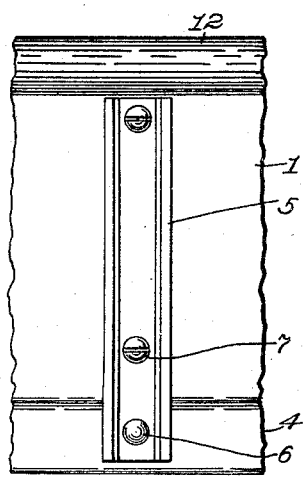
Figure 1:
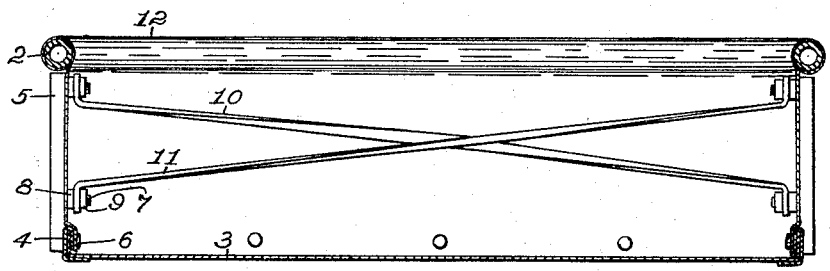

My invention relates to improvements in tank construction, and the object of my improvement is to so construct and brace the parts of a tank as to render it strong and resistant to strain and hard usage. This object I have accomplished by the means which are hereinafter described and claimed, and which are illustrated in the accompanying drawings, in which:

Figure 1 is a transverse vertical section of an open-topped tank of my improved construction. Fig. 2 is a partial transverse vertical section, on an enlarged scale, of my said tank, with parts broken away, and showing the details of the brace-connections and the joints and other reinforcements of the tank-parts. Fig. 3 is a fragmentary detail elevation of a part of the outside side-wall of the tank, showing the reinforcing upright mounted thereon.

Similar numerals of reference denote corresponding parts throughout the several views.

My improved tank comprises a bottom-plate 3 and a side-wall 1. The tank has an open top, but it is obvious that the same might be closed if desired, without departing from the invention herein. The bottom-plate 3 has a raised rim. The lower part of said side-wall is reversely folded at 4 to provide, first, an upwardly-opening fold, and second, a downwardly-opening fold, with the outer wall of the latter fold carried under and clenched upon the bottom of said bottom-plate 3, when the raised rim of the latter has been seated within the cavity of said downwardly-opening fold. The said raised rim is secured within and to said folds by means of the rivets 6.

The upper rim of the side-wall 1 is beaded or rolled at 12, and contains a tubular reinforcement body 2 which lends great strength and stiffness to it.

The numeral 5 denotes one of a plurality of vertical channel-bars which are mounted on opposite sides of the tank wall 1. Both the side-wall and said uprights are provided with registering orifices at their upper and lower ends, and screw-bolts 7 are passed through the orifices inwardly, their heads engaging the outer surface of the channel-bars or uprights. Upon the inwardly projecting parts of said bolts are mounted the nuts 8 in contact with the inner surface of the side-wall 1.

The numerals 10 and 11 denote bars or braces extending across the hollow of said tank, and crossing each other medially. Their extremities are bent upwardly and downwardly respectively on opposite ends, the angularly bent parts being orificed to permit them to be mounted on the bolts 7, and nuts 9 are then placed on the ends of the bolts to compress the said bent ends upon the nuts 8 and the latter upon the inner wall of the tank so that the nuts 8 may seat themselves sealingly and flatly against said wall.

The uprights 5 coöperate with bolts 7 and braces 10 and 11 to strongly reinforce the tank and said bolts cannot pull out. The whole construction is thus made lasting, and can withstand hard usage without damage.

Having described my invention, what I claim as new, and desire to secure by Letters Patent, is:

A tank construction, comprising a tank having reinforcing bodies mounted on the opposite outer sides thereof, the bodies and the tank wall having spaced pairs of registering orifices, bolts passed from without through said registering orifices, nuts on said bolts contacting with the inner wall of the tank, bars crossing each other medially and traversing the entire width of the hollow of the tank, having their ends bent angularly with the angular parts orificed and said bolts passed through their orifices, and lock-nuts mounted on the ends of the bolts to secure the angular parts of said bars on the oppositely-located bolts compressingly against the first-mentioned nuts.

Signed at Waterloo, Iowa, this 14th day of April, 1915.

ANTON W. KEGLER.

Witnesses:
G. C. KENNEDY,
PEARL STANTON.

Copies of this patent may be obtained for five cents each, by addressing the "Commissioner of Patents, Washington, D. C."